(12) United States Patent
Kordy et al.

(10) Patent No.: US 10,537,912 B2
(45) Date of Patent: Jan. 21, 2020

(54) MODULE, SYSTEM AND METHOD FOR APPLYING A VISCOUS MEDIUM TO A SURFACE AND METHOD FOR PRODUCING THE MODULE

(71) Applicant: Fraunhofer-Gesellschaft zur Förderung der angewandten Forschung e.V., Munich (DE)

(72) Inventors: Heinrich Kordy, Bremen (DE); Lars Pospiech, Bremen (DE); Manfred Peschka, Bremen (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 8 days.

(21) Appl. No.: 15/323,673

(22) PCT Filed: Jun. 30, 2015

(86) PCT No.: PCT/EP2015/064844
§ 371 (c)(1),
(2) Date: Apr. 4, 2017

(87) PCT Pub. No.: WO2016/001222
PCT Pub. Date: Jan. 7, 2016

(65) Prior Publication Data
US 2017/0274409 A1    Sep. 28, 2017

(30) Foreign Application Priority Data
Jul. 3, 2014  (DE) .......................... 10 2014 212 940

(51) Int. Cl.
*B05C 5/02*  (2006.01)
*B05C 1/14*  (2006.01)
(Continued)

(52) U.S. Cl.
CPC .............. *B05C 5/0258* (2013.01); *B05C 1/14* (2013.01); *B05C 5/0275* (2013.01); *B05C 11/04* (2013.01);
(Continued)

(58) Field of Classification Search
None
See application file for complete search history.

(56) References Cited

U.S. PATENT DOCUMENTS 2,726,632 A * 12/1955 Asbeck ................ B05C 5/0254
  118/410
3,792,682 A *  2/1974 Phipps ...................... B05C 1/04
  118/411
(Continued)

FOREIGN PATENT DOCUMENTS

DE    2812219 A  *  9/1979
DE    3222335 A1    12/1983
(Continued)

OTHER PUBLICATIONS

English translation of DE2812219 (1979).*
(Continued)

*Primary Examiner* — Charles Capozzi
(74) *Attorney, Agent, or Firm* — Schwegman Lundberg & Woessner, P.A.

(57) ABSTRACT

The invention relates to a method and to a module (I) for applying a viscous medium (19), in particular an adhesive or lacquer, to a surface (16) wherein the module (I) comprises a reservoir (2) that can be fed with the viscous medium (19), wherein the outer surface (4) of the module (I) comprises an outlet region (5) for the viscous medium (19), wherein the module (I) comprises at least one nozzle channel (6) which fluidly connects the reservoir (2) to the outlet region (5), wherein a smallest diameter (dmin) of the at least one nozzle
(Continued)

channel (6) is smaller than 0.8 mm and wherein the module (I) does not comprise any movable parts for closing the at least one nozzle channel (6).

27 Claims, 5 Drawing Sheets

(51) Int. Cl.
  *B29C 35/08*   (2006.01)
  *B29C 59/04*   (2006.01)
  *B05C 11/04*   (2006.01)
  *B05D 1/26*   (2006.01)
  *B05D 3/12*   (2006.01)
  *B05D 7/26*   (2006.01)
  *B29C 45/26*   (2006.01)
  *B29C 59/02*   (2006.01)

(52) U.S. Cl.
  CPC ............... *B05D 1/26* (2013.01); *B05D 3/12* (2013.01); *B05D 7/26* (2013.01); *B29C 35/0888* (2013.01); *B29C 45/26* (2013.01); *B29C 59/046* (2013.01); *B29C 2035/0827* (2013.01); *B29C 2059/023* (2013.01)

(56) References Cited

U.S. PATENT DOCUMENTS

| | | | | |
|---|---|---|---|---|
| 4,025,671 | A | * | 5/1977 | Creamer ............... B05C 5/027 118/221 |
| 5,145,528 | A | * | 9/1992 | Watanabe ............ B05C 5/0254 118/411 |
| 5,335,825 | A | * | 8/1994 | Fort ..................... B05C 5/0275 222/1 |
| 5,670,577 | A | * | 9/1997 | Dawson, Jr. ........... C09J 153/02 525/95 |
| 2003/0003234 | A1 | * | 1/2003 | Park ..................... B05C 5/0208 427/355 |
| 2005/0066889 | A1 | * | 3/2005 | Rantanen ................ B05C 5/008 118/300 |
| 2007/0256460 | A1 | * | 11/2007 | Von Pander ............. D06B 1/06 68/147 |
| 2009/0304936 | A1 | * | 12/2009 | Nakazawa ............... B05C 5/027 427/348 |

FOREIGN PATENT DOCUMENTS

| | | |
|---|---|---|
| DE | 19532387 A1 | 10/1996 |
| DE | 10346124 B4 | 12/2005 |
| EP | 0523589 A1 | 1/1993 |
| EP | 0539971 A1 | 5/1993 |
| WO | WO-2005030472 A1 | 4/2005 |
| WO | WO-2005030474 A1 | 4/2005 |
| WO | WO-2006129776 A1 | 12/2006 |
| WO | WO-2009144295 A1 | 12/2009 |
| WO | WO-2013083682 A1 | 6/2013 |

OTHER PUBLICATIONS

"International Application No. PCT/EP2015/064844, International Search Report dated Apr. 15, 2016", w/ English Translation, (Apr. 15, 2016), 7 pgs.

"International Application No. PCT/EP2015/064844, Written Opinion dated Apr. 15, 2016", w/ English Translation, (Apr. 15, 2016), 13 pgs.

"European Application Serial No. 15 733 705.6, Office Action dated Aug. 30, 2019", w/ Concise Statement of Relevance, (Aug. 30, 2019), 10 pgs.

* cited by examiner

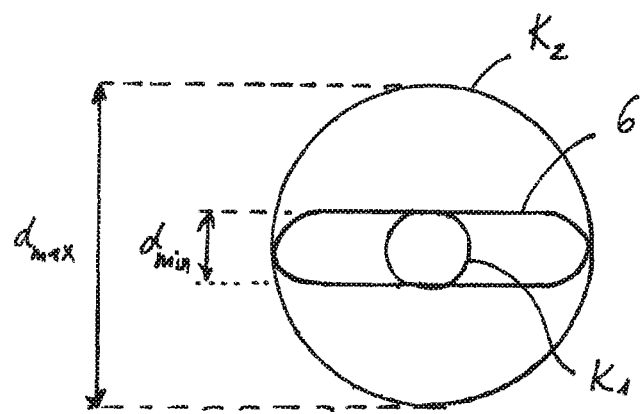
Fig. 4A
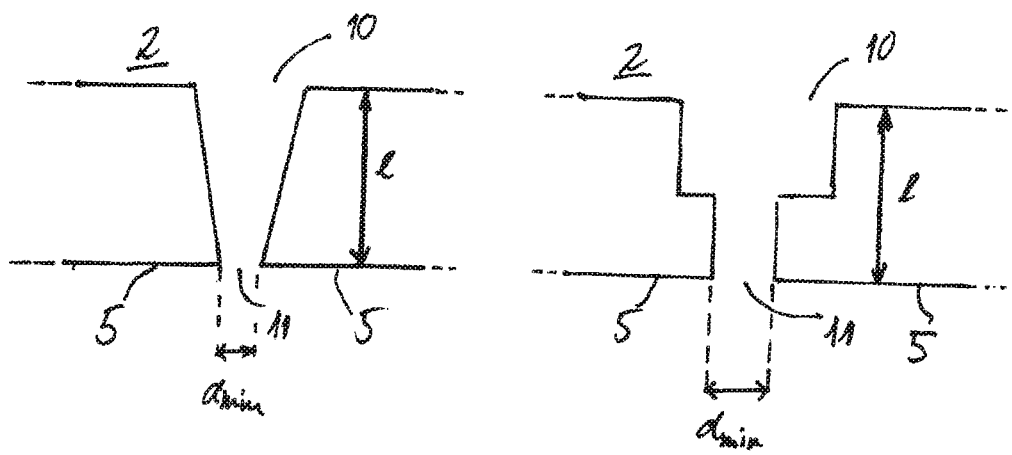
Fig. 4B
Fig. 4C

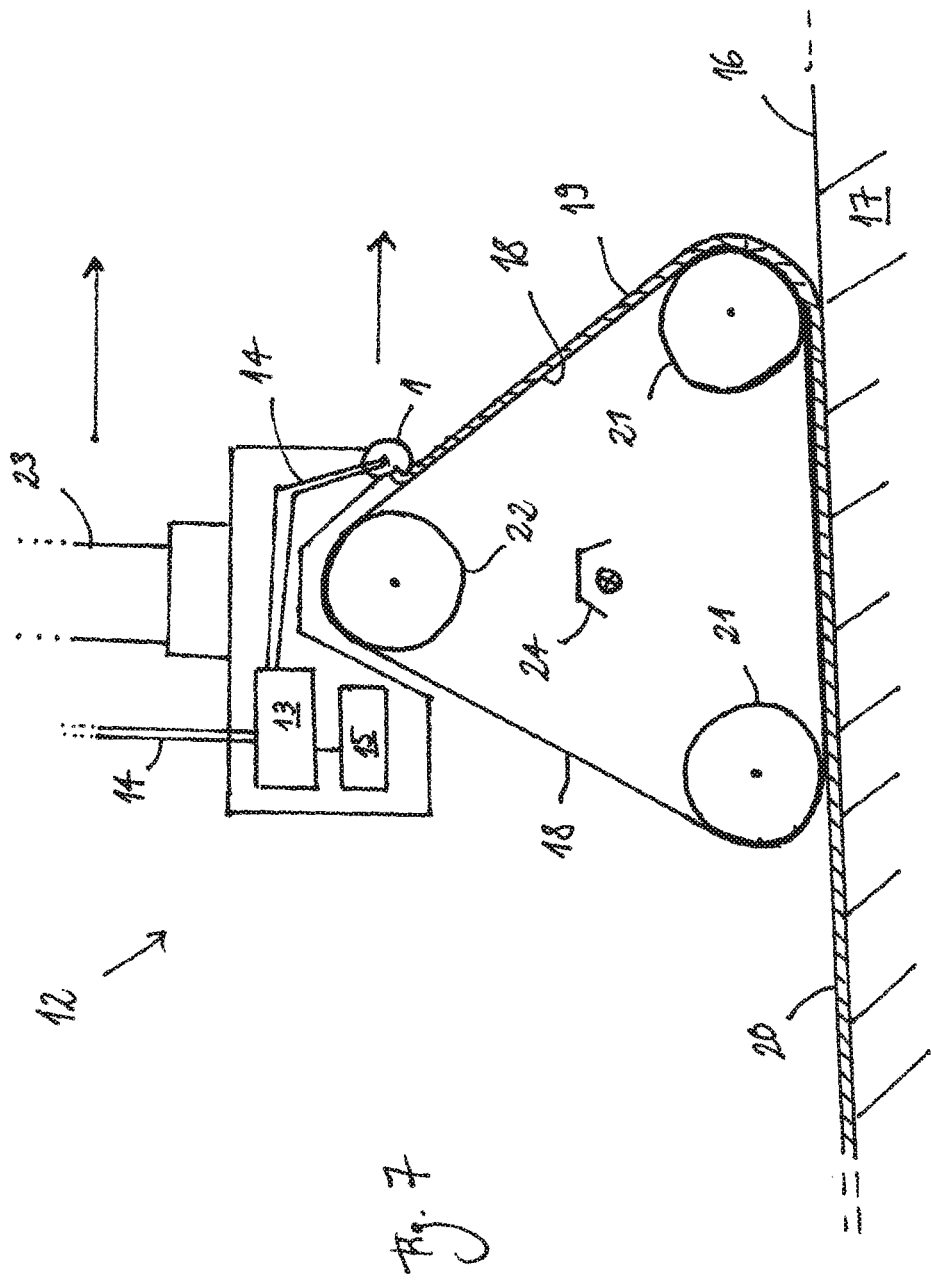

MODULE, SYSTEM AND METHOD FOR APPLYING A VISCOUS MEDIUM TO A SURFACE AND METHOD FOR PRODUCING THE MODULE

BACKGROUND

The invention relates to a module, to a system and a method for depositing a viscous medium onto a surface, as well as to a method for manufacturing a module.

A module for depositing a viscous medium onto a surface of a workpiece is described for example in the publication WO 2009/144295 A1. The module which is described there is designed as a wide-slot nozzle which comprises a reservoir with a slot and with a closure mechanism. The slot can be opened and closed by way of the closure mechanism, in order to thus switch on and off a mass flow of the viscous medium through the slot in a precise manner. Such wide-slot nozzles however are relatively expensive due to the closure mechanism, and demand an extensive cleaning after use.

SUMMARY

It is therefore the object of the present invention, to suggest a module for depositing a viscous medium onto a surface, which can be manufactured and handled as simply as possible. An as simple and inexpensive as possible manufacturing method for such a module as well as a method for depositing a viscous medium whilst using such a module, as well as a system with such a module are also to be put forward.

This object is achieved by a module according to the main claim, as well as by a method for using such a module, by a system comprising such a module and by a manufacturing method for such a module, according to the independent claims. Preferred embodiments and further developments are to be deduced from the remaining claims.

Accordingly, the module suggested here is suitable for depositing a viscous medium onto a surface. With regard to the surface which is mentioned here and hereinafter, it can be the case for example of a surface of any substrate, onto which the viscous medium can be deposited, such as the surface of a workpiece, of a component or of a matrix. With regard to the viscous medium which is mentioned here and hereinafter, it can be the case for example of an adhesive, a paint or lacquer such as a curable lacquer for the manufacture of a microstructure. Further examples and details concerning the viscous medium and the surface are specified further below.

The module comprises a reservoir which can be fed (filled) with the viscous medium, for example via media connections of the module which are designed for this. The reservoir for example can be a cavity in the module. The reservoir is preferably designed in a cylinder-shaped manner, so that an as uniform as possible overpressure (measured with respect to the ambient pressure, thus typically with respect to the atmospheric pressure) can be created in the reservoir when depositing the viscous medium. A uniform overpressure favors a uniform media discharge out of the reservoir. For the same reason, the module can comprise two or more media connections for feeding the reservoir, said media connections being uniformly distanced to one another and being arranged for example at opposed ends of the reservoir. The overpressure in the reservoir and which is necessary for the depositing of the medium, as is mentioned in more detail further below, is typically created exclusively by the delivery of the medium to the deposited, into the reservoir, and is controlled or regulated (closed-loop controlled). The media discharge through the nozzle channels is moreover typically caused exclusively by the overpressure. Centrifugal forces due to a rotation of the module about its longitudinal axis in contrast are typically of no significance. Typically, no rotation of the module about its longitudinal axis is effected during the media discharge out of the reservoir, so that centrifugal forces neither effect, nor significantly influence the media discharge. The module is typically fixed in a rotationally fixed manner with respect to its longitudinal axis by way of a holder, during the discharge of media.

The outer surface (thus the external surface) of the module comprises an outlet region for the viscous medium, said region typically extending along a complete longitudinal extension of the reservoir, for example along a longitudinal axis of the reservoir. The module comprises at least one nozzle channel, thus either precisely one nozzle channel or several nozzle channels. For the sake of brevity and clarity, "the nozzle channel" is simply written sometimes instead of "the at least one nozzle channel", wherein that which is mentioned however still continues to refer to "the at least one nozzle channel", thus to all nozzle channels in the case of several nozzle channels. When a certain characteristic (such as smallest diameter, largest diameter, cross-sectional area, channel length, channel course, passage resistance etc.) of the at least one nozzle section is described, then it is the respective characteristic of each nozzle channel which is meant in the case of several nozzle channels.

The at least one nozzle channel fluidically connects the reservoir to the outlet region, so that the viscous medium can flow out of the reservoir, through the at least one nozzle channel up to the outlet region. Departing from the outlet region, the viscous medium can be discharged onto the respective surface (of the substrate, of the component or of the matrix for example, see below). Typically, the outlet region is not designed arcuately in the direction of the longitudinal axis or of the longitudinal extension of the reservoir, but in a straight or plane manner, in order to be able to deposit the viscous medium onto a plane surface in a particularly uniform manner.

The present invention is based on the recognition that it is possible to switch on and switch off a mass flow of the viscous medium out of the reservoirs in a simple, and in most cases in an adequately precise manner, with the help of the at least one nozzle channel. The at least one nozzle channel has a passage resistance to the viscous medium, said passage resistance opposing the mass flow of the viscous medium through the at least one nozzle channel and braking this mass flow or bringing it to a complete standstill, depending on the magnitude of the overpressure of the viscous medium within the reservoir. The passage resistance in particular is attributed to the friction of the viscous medium on the channel inner walls of the at least one nozzle channel as well as to the inner friction of the medium with the at least one nozzle channel during the outflow of the viscous medium. These friction effects thus effect a relatively high pressure drop within the at least one nozzle channel.

For this reason, in order to produce a mass flow of the viscous medium through the at least one nozzle channel, the viscous medium in the inside of the reservoir must be subjected to an overpressure which is sufficiently high to overcome the passage resistance of the at least one nozzle channel. If therefore the delivery of the viscous medium into the reservoir is stopped for example, the overpressure in the reservoir drops relatively quickly to such an extent, that the overpressure is no longer sufficient for maintaining the mass flow. For this reason, the mass flow of the viscous medium through the at least one nozzle channel (and thus also the depositing of the viscous medium onto the surface) can be stopped in a very abrupt and precise manner by way of a sufficient reduction of the overpressure within the reservoir, for example by way of stopping the delivery of the viscous medium into the reservoir. An undesirable post-flowing after the pressure reduction is greatly suppressed and largely prevented by way of the high passage resistance of the at least one nozzle channel. An undesirable post-flowing in the case of conventional wide-slot nozzles can be caused for example by way of a residual pressure which continues to prevail in the reservoir and/or by way of gravity (if the slot of the reservoir is orientated to the bottom for example).

The mass flow can also be started in a very abrupt and precise manner with the help of the at least one nozzle channel. At first, no mass flow is produced in the case of too low an overpressure. It is only when the (relatively high) overpressure necessary for the mass flow has been reached, for example by way of a suitable delivery of the viscous medium into the reservoir, that the viscous medium is deposited out of the reservoir, through the nozzle channel.

Advantageously, the module comprises no closure mechanism of its own, and no moving parts for the closure or the blocking of the at least one nozzle channel, such as for instance a (automatic or manually operable) closure mechanism, and can thus be manufactured in a particularly simple and inexpensive manner. As a simple and inexpensive disposable part, the module can be disposed of after use and be replaced by a corresponding module, which is to say one having the same construction. A complicated cleaning of the module can therefore be done away with, said cleaning often burdening the environment and, for instance with the application of organic solvents for removing the remains of paint, can render necessary extensive protective measures combating possible health risks to personnel. The module can be manufactured from a plastic, for example from a plastic which is suitable for the manufacture of the module with the injection molding method. The module can thus be designed as an injection molded part. The group of polyolefins such as polyethylene and polypropylene as well as polyamide is suitable here as a plastic. The module can moreover consist of several module segments which are put together axially into the module. These module segments for example can comprise two end segments or end-caps of the same type, which laterally terminate the reservoir and which, as the case may be, can each comprise one of the mentioned media connections. The module segments can moreover comprise one or more intermediate segments which can be arranged between the end-segments or end-caps, laterally encompass the reservoir and comprise the at least one nozzle channel. The intermediate segments can be designed for example in a tubular manner and each form an axial section of the module (with respect to the longitudinal axis of the module). The module segments can be connected to one another for example by way of suitably designed connection elements of the module, for example by way of clamping elements or tensioning elements, acting in the axial direction.

The achievable pressure drop in the at least one nozzle channel depends to a particularly high extent on the smallest diameter of the at least one nozzle channel. As already mentioned above, in the case of several nozzle channels, each of the nozzle channels can have an individual smallest diameter. When one speaks of the smallest diameter of the at least one nozzle channel, it is the smallest diameter of each nozzle channel which is meant. This accordingly also applies to the largest diameter which is mentioned further below and the channel length of the at least one nozzle channel. Typically, the smallest diameter of the at least one nozzle channel in each case is 0.8 mm or less, and the smallest diameter for example can also be less than 0.6 mm to 0.1 mm. Moreover, one can envisage the at least one nozzle channel having a largest diameter, wherein the largest diameter of the at least one nozzle channel is smaller than 3 mm, preferably smaller than 2 mm. In the special case of only single nozzle channel, this preferably extends along the complete longitudinal extension of the reservoir, thus is designed as a narrow, long slot. The largest diameter of the nozzle channel then roughly corresponds to the total length of the reservoir.

Here, a cross-sectional area of the nozzle channel can be used for the definition of the smallest diameter. The used cross-sectional area is preferably orientated perpendicularly to the course of the nozzle channel from the reservoir up to the outlet region, thus perpendicularly to a longitudinal extension or a longitudinal axis of the nozzle channel. Generally, the smallest diameter can be defined as the diameter of the largest possible circle lying completely within the considered cross-sectional area of the nozzle channel (i.e. as the diameter of the largest possible inscribed circle of the cross-sectional area). Accordingly, a largest diameter of the nozzle channel can generally be defined as the diameter of the smallest possible circle completely containing the cross-sectional area (i.e. as the diameter of the smallest possible circumscribed circle of the cross-sectional area). In the special case of a circularly round cross-sectional area, the smallest diameter is equal to the largest diameter and corresponds to the normal diameter of the cross-sectional area. In the case of differently shaped, non-circular cross-sectional areas, the smallest diameter is smaller than the largest diameter of the respective nozzle channel.

Each of the at least one nozzle channel runs from an inlet opening of the respective nozzle channel, with which inlet opening the nozzle channel runs out in the reservoir, up to an outlet opening of the respective nozzle channel, with which outlet opening the nozzle channel runs out in the outlet region on the outer surface of the module. The at least one nozzle channel has a channel length which is measured from the reservoir up to the outlet region and which can be defined as the distance between the respective inlet opening and the outlet opening. Typically, the channel length is 0.8 mm or more, for example 1.6 mm or more.

Moreover, it is possible for the at least one nozzle channel to have a cross-sectional area which changes along the course of the channel, from the reservoir to the outlet region, and for example narrows or widens along this course. The at least one nozzle channel for example can be designed in a step-like or conical manner With such changing cross-sectional areas, the smallest (and largest) diameter of a nozzle channel is typically defined by the smallest value of the smallest diameter (and respectively by the largest value of the largest diameter) along the complete course of the respective nozzle channel.

Moreover, it is necessary for the module to be sufficiently dimensionally stable, in order to be able to withstand the overpressure, to which the viscous medium in the reservoir is subjected. Typically, an overpressure of more than 1.5 bar is applied, depending on the viscosity of the viscous medium and the magnitude of the pressure drop in the at least one nozzle channel, and the overpressure typically lies in a range between 1.5 bar and 30 bar.

The reservoir typically has a length (measured along the aforementioned longitudinal extension or longitudinal axis) of more than 10 cm or of more than 50 cm. The length however should typically not be greater than 100 cm or not more than 150 cm. In the case of several nozzle channels, the nozzle channels are preferably arranged along the complete longitudinal extension of the reservoir (so that the outlet region extends along the complete length of the reservoir). Typically, the distances (measured in the direction of the longitudinal axis of the reservoir) of adjacent nozzle openings lie in a range between 0.2 mm and 3 mm. The number of nozzle openings per unit of length is at least 100/m. The larger the number of nozzle channels, the greater is the total mass flow through the at least one nozzle channel at a given overpressure. If the nozzle channels are designed in a very narrow manner and with a large channel length, in order to permit an as high as possible pressure drop and a best possible controllable on and off switching of the mass flow, then an adequate total throughput at a given overpressure can be achieved by an increased number of nozzle channels.

The nozzle channels in the outlet region can be arranged for example in a rowed manner, thus in at least one row, in order to permit a high number of nozzle channels, wherein the at least one row of nozzle channels runs along the longitudinal extension (or the longitudinal axis) of the reservoir. The nozzle channels can be arranged for example in two or more rows, wherein these rows preferably run parallel to one another and parallel to the longitudinal extension or longitudinal axis of the reservoir. In particular, it is possible for the nozzle channels to be arranged in adjacent rows, in a manner offset to one another in the direction of the longitudinal extension of the reservoir, in order to obtain an as uniform as possible and simply manufacturable arrangement of the nozzle channels. (Imagined) connection lines of adjacent nozzle channels form a zigzag pattern in this manner.

The module can comprise a doctor edge which preferably runs along the outlet region. The doctor edge is thus typically arranged on the outer surface of the module and is therefore located on the outer side of the module. The doctor edge can be formed by a part-region of the outer surface of the module. This part-region for example can be shaped out in a stepped or edge-like manner. The part-region can be adjacent the outlet region. For example, a distance between the nozzle channels and the doctor edge can lie between 0 mm and 2 mm. Moreover, the doctor edge can be shaped in a sharp-edged or rounded manner. In the case that the nozzle channels are arranged in a rowed manner, the doctor edge typically runs along or parallel to the at least one row of the nozzle channels. By way of the doctor edge, it is possible to distribute the viscous medium deposited onto the surface, on the surface, for example by way of moving the module and the surface relative to one another in a suitable manner during the depositing. A particularly uniform layer thickness of the viscous medium on the surface can be achieved for example by way of the doctor edge. Moreover, with the doctor edge, it is possible to bring the viscous medium particularly well into recesses of the surface, inasmuch as are present, for example in the case that the surface is structured, as in the case of matrices, whose surfaces have a negative form to a surface structure to be produced, as will be described in more detail further below.

The method suggested here is suitable for depositing a viscous medium onto a surface whilst applying a module of the type suggested here. The method is characterized in that
the discharge of the viscous medium out of the reservoir of the module, through the at least one nozzle channel is begun and is maintained by way of the overpressure of the viscous medium in the reservoir being increased until the passage resistance of the at least one nozzle channel to the viscous medium is overcome (and the viscous medium flows out of the reservoir, through the at least one nozzle channel) and
that the discharge of the medium is stopped or interrupted without blocking the at least one nozzle channel by way of closure elements or the like, by way of the overpressure of the viscous medium within the reservoir being reduced at least until the passage resistance of the at least one nozzle channel to the viscous medium is no longer overcome (and the flow of the viscous medium through the at least one nozzle channel is stopped by the pressure loss of the viscous medium in the at least one nozzle channel).

The depositing of the viscous medium onto the surface is typically begun and maintained or stopped, practically simultaneously, with the discharge of the medium out of the reservoir. With the method, the at least one nozzle channel is thus not opened or closed, in order to begin or end the depositing of the viscous medium. In contrast, the at least one nozzle channel is kept in the opened condition during the whole method. The method is therefore carried out without influencing the mass flow of the viscous medium through the at least one nozzle channel by way of moving closure elements at the at least one nozzle channel. The cleaning of such closure elements after carrying out the method is therefore also done away with.

An adhesive, a paint or a lacquer, in particular a curable lacquer for manufacturing a microstructured surface, for example a dual-cure lacquer, can be applied for example as a viscous medium. The used viscous medium typically has a (dynamic) viscosity of 0.5 Pa·s or more. The viscous medium thus has a relatively small flowability and can be present for example as a paste. The viscosity however, as a rule is not more than 150 Pa·s.

In particular, the suggested method is suitable for the manufacture of a microstructured surface, for example in the manner described in the patent document DE 103 46 124 B4 and in the related post-published application WO 2005/030472 A1. The module which is suggested here can therefore also be part of the tool described in these publications. All details which are specified in these publications, in particular with regard to the microstructure and the microstructured surface, to the objects on which such microstructured surfaces are created, to the viscous medium (indicated as a (curable) material in the mentioned publications), to the tool described there, in particular to the matrix described there, to the pressing roller, to the device for accelerating the curing as well as to the method steps described there, are thus adopted into the present application and can accordingly be conferred upon the subsequently described embodiments examples for the method suggested here.

In accordance with the terminology of the latter-mentioned publications, a microstructured surface is to be understood as a surface which comprises a microstructure, which is to say a surface topography which essentially comprises structures with a distance to one another and a depth, in the range of 100 μm to 0.5 μm, preferably 50 μm to 0.5 μm. With regard to the microstructure, it can be the case for example of a so-called riblet structure which for example can comprise rib-like or web-like prominences. Riblet structures can effect a reduction of the drag on surfaces, over which turbulent flow occurs, and are therefore created on surfaces of aircraft, railway vehicles, marine vessels, in particular on the surfaces of their fuselages/hulls, and/or on wind energy facilities, in particular on the surfaces of their rotor blades.

The microstructure can be effected by way of casting (e.g. embossing) for example by way of a matrix, as is described below. Herein, the error of the casting (deviation from the desired shape) is typically smaller than 5 µm, preferably smaller than 1 µm. In one variant of the method suggested here, a microstructure is produced on a surface of a component by way of casting a matrix which has a negative (thus negative form) of the microstructure to be produced. The matrix is preferably shape-flexible, in order to be able to adapt to the curvatures of the respective component surface. The viscous medium can subsequently be deposited onto the negative of the matrix by way of the module and subsequently onto the component surface by way of the matrix. Alternatively, it is also possible to deposit the viscous medium directly onto the component surface and to subsequently bring the deposited viscous medium into contact with the matrix. In both cases, a layer of the viscous medium is produced on the component surface, and the matrix with the negative is pressed onto the component surface, for example by way of the aforementioned pressing roller, so that the microstructure to be produced is transferred onto the layer by way of molding, by means of the negative of the matrix. Here, the layer of the viscous medium is thus located between the component and the negative of the matrix. For example, the roller can be rolled over the surface such that the matrix is brought into a rolling movement between the roller and the surface, so that the negative of the matrix faces the surface. The matrix can be designed as a belt or strip, in particular as a continuous belt.

Typically, the layer formed from the viscous material is completely or at least partly cured whilst it is still located between the matrix and the component surface, thus in situ, in order to stabilize the layer and the microstructure which is manufactured on it. The device for accelerating the curing and which has already been mentioned above and can comprise a (UV) radiation source or a heat source for example can be applied, in order to accelerate the curing. After a sufficient curing of the viscous material in the layer, the matrix can be removed from the component surface, without the microstructure in the layer of the (initially viscous) medium running or the layer detaching from the component surface. This removal can be effected for example by way of moving (rolling) of the pressing roller and/or a further roller, on the component surface (details concerning this can be deduced from DE 103 46 124 B4 or WO 2005/030472 A1).

In this manner, the component surface can be continuously or discontinuously provided with the microstructure along a practically arbitrarily long stretch, wherein for finishing the stretch or for producing an interruption of the microstructure in the course of the stretch, the material discharge from the reservoir can be simply and precisely stopped or interrupted by way of reducing the overpressure in the reservoir, as has been described above. For starting a new stretch or for continuing the microstructure along an already begun stretch, the overpressure which is necessary for the discharge can simply be produced again, in order to continue the material discharge. The module can be replaced by a further, still unused module of the type described here, after the coating of the component surface has been completed or if a longer interruption of the method is to be effected.

The system which is suggested here is suitable for depositing a viscous medium onto a surface, and in particular for carrying out the method suggested here. All features which are described in the context of the method can before be accordingly conferred upon the suggested system. The system comprises a module of the type suggested here, as well as a delivery (transport) device which is fluidically connectable to the module and is configured to deliver the viscous medium into the reservoir of the module and to subject it there to the already described overpressure. The overpressure of the viscous medium in the reservoir which is producible by way of the delivery device is thus so large that the viscous medium subjected to the overpressure flows out of the reservoir, through the at least one nozzle channel. The system as a rule therefore has no (automatically or manually operable) closure mechanism which is arranged at the at least one nozzle channel and which would be configured to open and close the at least one nozzle channel.

The delivery device can be controllable. The system can moreover comprise a control unit for the control of the delivery device, wherein the control unit is connected to the delivery device for the transmission of control signals, and is configured.
  to activate the delivery device such that the delivery device subjects the viscous medium within the reservoir to the mentioned overpressure, for starting a depositing procedure and for maintaining the depositing procedure,
  to activate the delivery device such that the delivery device reduces the overpressure of the viscous medium within the reservoir to such an extent that the mentioned passage resistance of the at least one nozzle channel stops the outflow of the viscous medium through the at least one nozzle channel, for stopping or interrupting the depositing procedure. This reduction of the overpressure can be achieved for example by way of stopping the delivery of the viscous medium into the reservoir by the delivery device, for example by way of switching off or inactively switching the delivery device, or by way of a closing of a controllable outlet valve of the delivery device. However, in particular no closure mechanism arranged at the at least one nozzle channel and for at the closure of the at least one nozzle channel is actuated or activated accordingly.

In a particular embodiment, the system is designed for carrying out the method suggested here, for manufacturing a microstructure on a component surface. The system then moreover comprises:
  a matrix with a negative of the microstructure which is to be produced, as is described above, wherein the matrix and the module are arranged such that the viscous medium can be deposited by way of the module onto the negative of the matrix or directly onto the component surface,
  a pressing roller which can roll over the component surface and is for pressing the matrix onto the component surface, wherein the pressing roller and the matrix are arranged such that on rolling the roller over the component surface, the matrix is brought into a rolling movement between the roller and the surface, so that the negative of the matrix faces the surface.

The system can moreover comprise all features which are described in the context of the suggested method. The system can moreover be designed as a tool of the type suggested in DE 103 46 124 B4 and WO 2005/030474 A1 and comprise each of the features which are described there. Accordingly, the method and the system which are suggested here can be designed such that with them, the micro-structuring of double-arcuate component surfaces, preferably on large structures such as aircraft, railway vehicles, marine vessels, in particular their fuselages/hulls and hulls, and/or wind energy facilities, in particular their rotor blades, is rendered possible.

The system can be moved for example relative to the surface, upon which the viscous medium is to be deposited. This movement is typically a relative displacement between the module and the surface, wherein a rotation of the module about its longitudinal axis is typically not effected (at least no rotation influencing the media discharge out of the reservoir). This can be effected for example in a manual manner or via the system's own drive, wherein the system can comprise driven wheels for example. The system can be designed as a mobile coating facility, which is configured for example for applying adhesives for carpets on building sites or for applying paints or lacquers. It is also possible for the system to be moved along the respective surface by way of a robot arm, in particular in the case of the already described creation of micro-structures on component surfaces, in particular with riblet application. However, the system can also be stationary, so that the surface, upon which the viscous medium is to be deposited, is moved relative to the system, thus for example relative to the outlet region of the module and/or relative to the aforementioned matrix. With regard to the system, it can also be the case of a stationary coating facility for a discontinuous manufacture, such as a desk-coater for example. The system typically comprises a holder for the module, by way own which the module is fixed in a rotational fixed manner with respect to its longitudinal axis, during the depositing of the medium.

With the method for manufacturing a module of the type suggested here, said method suggested here, a plastic which is suitable for being processed in an injection molding method is injected in the flowable condition into a molding tool. The molding tool is designed as a negative form of the module and can for example comprise a female mold and a core. The female mold which can be constructed in a single-part or multi-part manner comprises an interior which is a negative form of the outer surface of the module. The core, which can likewise be constructed in a single-part or multi-part manner, is a negative form of the reservoir of the module. The core or the female mold moreover comprise at least one pin or web which are designed as negative forms of the at least one nozzle channel of the module. The female mold for example can be designed such that it also comprises a region with a negative form of the doctor edge, inasmuch as such is provided. The doctor blade can then also be simultaneously manufactured by way of the injection molding method. The negative form of the doctor blade can for example be a channel-like or slot like recess on an inner surface of the female mold. The doctor edge is then therefore a part-region of the injection molding part, thus itself consists of the same plastic as the remainder of the injection molded part.

BRIEF DESCRIPTION OF THE DRAWINGS

The invention is hereinafter explained in more detail by way of some special embodiment examples, of which some are schematically represented in FIGS. 1 to 8. There are shown in:

FIG. 4B: a longitudinal section through a conically narrowing nozzle channel of a module of the type suggested here, FIG. 4C: a longitudinal section through a nozzle channel of a module of the type suggested here, said nozzle channel narrowing in a stepped manner.

DETAILED DESCRIPTION OF EXEMPLARY EMBODIMENTS

Figure 1:
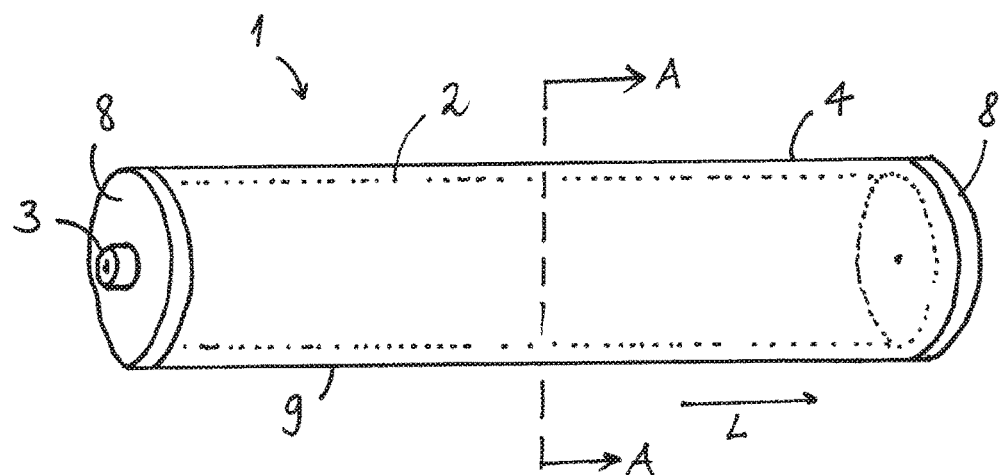
FIG. 1: a module of the type suggested here, in a perspective view.

Recurring reference numerals in the figures indicate the same features or features which correspond to one another. The figures do not represent images which are true to scale, but as simplified, schematic representations serve merely for illustration purposes.

A perspective view of a module 1 of the type suggested here, for depositing a viscous medium onto a surface, is shown in FIG. 1. With regard to the surface, it can be the case for example of a surface of a component or a matrix, as is show in FIG. 7. Concerning the viscous medium, it can be the case for example of a curable lacquer/paint, for instance a dual-cure lacquer, for the manufacture of a riblet structure on a component surface, as is described in more detail further below.

A reservoir 2 of the module 1 for the viscous medium is drawn in FIG. 1 by a dashed line. The module 1 comprises two media connections 3 for feeding the reservoir 2 with the viscous medium, and these are arranged at ends of the reservoir 2 which are opposed to one another, as can also be seen in FIG. 5.

Figure 2:
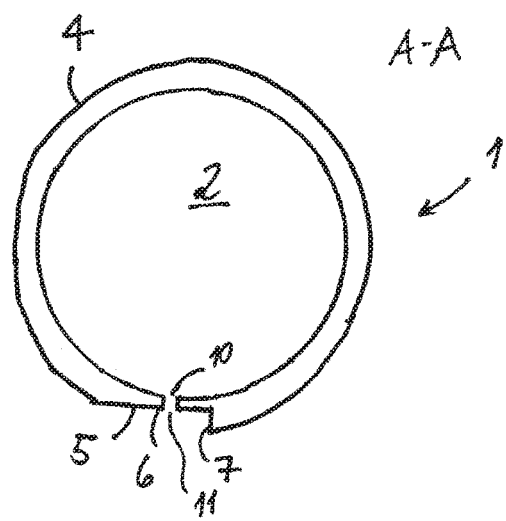
FIG. 2: a view of a cross section through the module which is represented in FIG. 1, along the section line shown in FIG. 1, FIG. 3: a greatly enlarged part-region of FIG. 2, FIG. 4A: a cross-sectional area of a nozzle channel with an elongate cross-sectional area of a module of the type suggested here.
Figure 3:
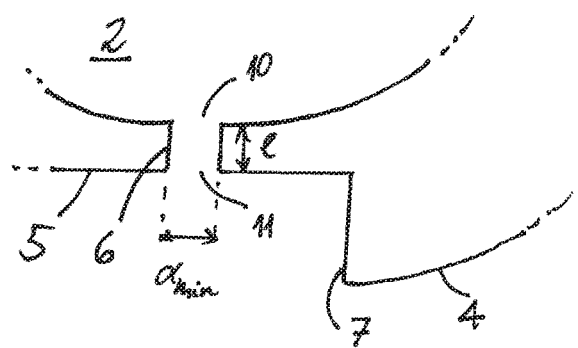

As can be recognized in the cross section of the module 1 which is shown in FIGS. 2 and 3 (the associated section line A-A is drawn in FIG. 1), the reservoir 2 in this example is designed as a cylinder-shaped cavity in the module 1. The outer surface 4 of the module 1 comprises a plane outlet region 5 for the viscous medium and this region extends along the longitudinal axis L of the reservoir 2, see FIG. 1. The module 1 moreover comprises a multitude of nozzle channels 6 which each fluidically connect the reservoir 2 to the outlet region 5, see also FIG. 5. A doctor edge 7 of the module 1 is arranged adjacently to the outlet region 5.

The module 1 has no closure mechanism and no moving parts for closing or blocking the nozzle channels 6. As described further below by way of FIG. 8, with regard to the module 1, it is the case of an injection molded part which is simple and inexpensive to manufacture and which is envisaged a disposable (single-use) part. In the present example, the module consists of several module segments which have been axially put together. Two end-caps 8 terminate the reservoir 2 at the end side and carry the lateral media connections 3. An intermediate segment 9 which laterally encompasses the reservoir 2 and comprises the nozzle channels 6 is arranged between the two end-caps 8. Instead of only one intermediate segment 9, the module 2 could also comprise several intermediate segments 9 of the same type, which are axially connected to one another, in order to achieve a corresponding larger total length of the module. The module segments 8, 9 are connected to one another by way of connection elements (not represented here), for example by way of clamping or tensioning elements, which act in the axial direction.

The passage resistance of the nozzle channels 6 to the viscous medium is particularly dependent on a smallest diameter $d_{min}$ of the nozzle channels 6 and also on their length l. In the present example, the nozzle channels 6 have a uniform, circularly round cross-sectional area over their entire length l, so that the smallest diameter $d_{min}$ corresponds to the standard diameter of the nozzle channel 6, see FIG. 3. In the present example, the smallest diameters $d_{min}$ are for example 0.8 min and the lengths l of the nozzle channels 1 mm. Each of the nozzle channels 6 runs from an inlet opening 10 of the respective nozzle channel 6, with which inlet opening the nozzle channel 6 runs out in the reservoir 2, up to an outlet opening 11 of the respective nozzle channel 6, with which outlet opening the nozzle channel 6 runs out in the outlet region 5 on the outer surface 4 of the module 1. The nozzle channels 4 each have channel length l which is measured from the reservoir 2 up to the outlet region 5. In this example, the channel lengths l are each 1 mm.

As is shown in FIG. 4A, the nozzle channels 6 instead of having a circularly round cross section, can also for example have a longitudinally extended, in this case an oval cross-sectional area. Here, the smallest diameter $d_{min}$ is for example 0.5 mm and the largest diameter $d_{max}$ 2 mm, and these are defined as the diameter of the largest possible inscribed circle $K_1$ and as the diameter of the smallest possible circumscribed circle $K_2$ respectively.

As is shown in FIGS. 4B and 4C, it is also possible for the nozzle channels 6 to have cross-sectional areas which change along their channel course from the reservoir 2 to the outlet region 5 and which narrow or widen along this course. For example, the nozzle channel 6 which is represented in FIG. 4B conically narrows towards the outlet opening 11 and there has the smallest diameter $d_{min}$ of 0.5 mm. The nozzle channel 6 which is represented in FIG. 4C narrows in a stepped manner towards the outlet opening 11 and there has a smallest diameter $d_{min}$ of 0.6 mm.

Figure 5:
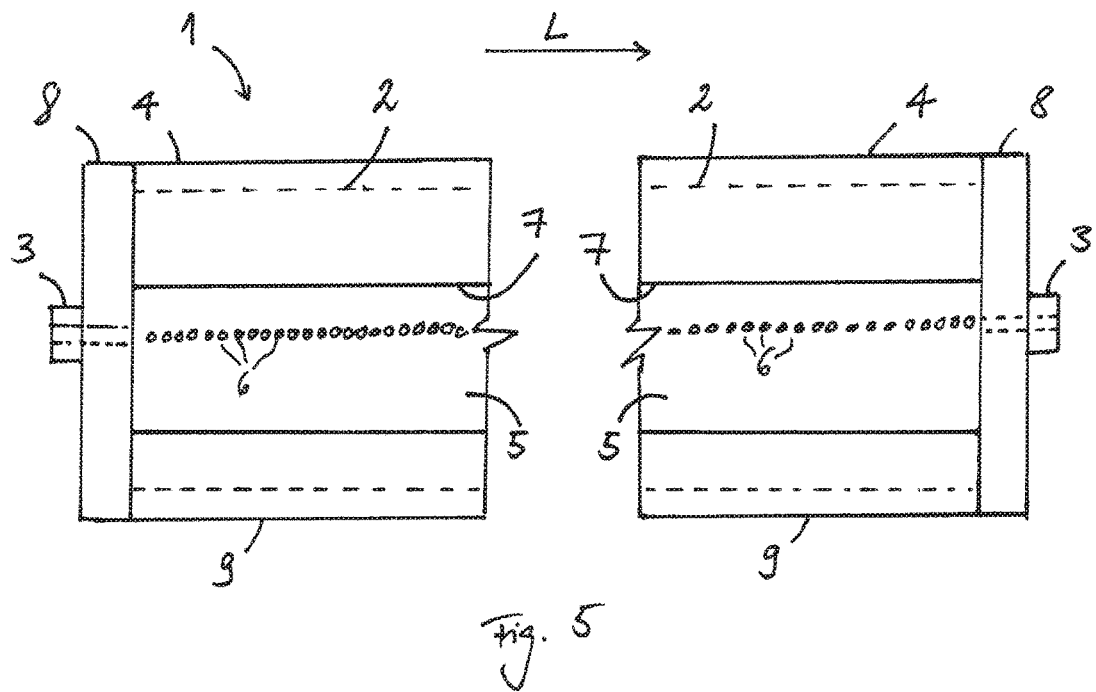
FIG. 5: the module represented in FIG. 1, in a lateral view.
Figure 6A:
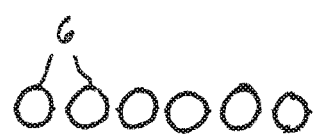
FIG. 6A: a greatly enlarged part-region of FIG. 5, FIG. 6B: the part-region which is shown in FIG. 6A, for a two-rowed arrangement of the nozzle channels, FIG. 7 a lateral view of a system of the type suggested here, with the module represented in FIGS. 1 to 3 and FIG. 8 a view of a cross section through a molding tool of the type suggested here, for manufacturing the module shown in FIGS. 1 to 3.
Figure 6B:
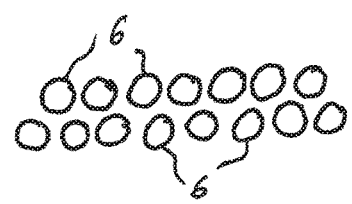

The module 1 which is shown in FIG. 1 is shown once again in a lateral view in FIG. 5, in which the nozzle channels 6 in the outlet region 5 and the doctor edge 7 are also to be recognized. One can moreover recognize that the nozzle channels 6 are arranged in a row which runs parallel to the doctor edge 7 and to the longitudinal axis L of the reservoir 2. The distance between two adjacent nozzle channels 6 (measured along the longitudinal axis L) in this example is 0.2 mm. This is also represented in an enlarged manner in FIG. 6A. An alternative arrangement of the nozzle channels 6, in which the nozzle channels 6 are arranged in two rows running parallel to the longitudinal axis L and axial offset to one another (connection lines between the nozzle channels 6 would form a zigzag pattern) is shown in FIG. 6B. Given the same axial distance between the nozzle channels 6 for example, twice as large a number of nozzle channels can be achieved in this manner, so that a total mass flow of the viscous medium out of the reservoir 2 and one which is twice as large can be produced given the same overpressure. The reservoir 2 for example has a length (measured along the longitudinal axis L) of 50 cm. The nozzle channels 6 are arranged along the entire longitudinal extension of the reservoir 2, so that the module 1 comprises in total 625 nozzle channels 6 in the case of a single-row arrangement according to FIG. 6A and in total 1250 nozzle channels 6 in the case of a double-row arrangement according to FIG. 6B.

The module 1 is designed in a sufficiently stable manner, in order to withstand the overpressure, to which the viscous medium in the reservoir 2 is subjected, in order to let it out of the reservoir 2, through the nozzle channels 6. Typically, an overpressure of more than 2 bar is applied, depending on the viscosity of the viscous medium and the size of the pressure drop in the nozzle channels 6, and typically the overpressure lies in a range between 2 bar and 30 bar. The applied viscous medium typically has a (dynamic) viscosity of 0.5 Pa·s or more and can be present as a paste for example. However, as a rule the viscosity is not more than 150 Pa·s.

FIG. 7 is a greatly schematized manner and in a lateral view shows a special example of a system 12 of the type suggested here, for manufacturing a microstructure on a surface 16 of a component 17, for example on a wing or a fuselage of an aircraft. The system 12 comprises a module 1 of the type suggested here, such as the module 1 shown in FIG. 1 for example, as well as a controllable delivery device 13 which is configured to deliver the viscous medium via two media conduits 14 (only one is shown in FIG. 7) connected to the media connections 3 of the module 1, into the reservoir 2 of the module 1 and there to subject it to any adequately high overpressure, so as to discharge it out of the reservoir 2 of the module 1, through the nozzle channels 6. The system 12 has no movable closure elements which are arranged at the nozzle channels 6 and which would be designed to open and close the nozzle channels.

A control unit 15 of the system 12 is configured
  to activate the delivery device 13 such that the delivery device 13 subjects the viscous medium within the reservoir 2 to the mentioned overpressure, for starting a depositing procedure and for maintaining the depositing procedure, and
  to activate the delivery device 13 such that the delivery device 13, by way of stopping the delivery, reduces the overpressure of the viscous medium within the reservoir 2 to such an extent that the passage resistance of the nozzle channels 6 stops the outflow of the viscous medium through the nozzle channels 6, for stopping or interrupting the depositing procedure.

The system 12 moreover comprise a flexible matrix 18 which is designed as a continuous belt and which is with a negative of the microstructure to be produced. The matrix 18 and the module 1 are arranged such that the viscous medium, shown in FIG. 7 and provided with the reference numeral 19, is deposited onto the negative of the matrix 18 by way of the module 1 and there is homogenized and brought into the recesses of the negative by way of the doctor edge 7. The system 12 moreover comprises two pressing rollers 21 which can roll over the surface 16 of the component 18, for pressing the matrix 18 onto the component surface 16, wherein the pressing rollers 21 and the matrix 18 are arranged such that when the pressing rollers 21 roll over the component surface 16, the matrix 18 is brought into a rolling movement between the pressing rollers 21 and the surface 16, so that the negative of the matrix 18 faces the surface 16. The system moreover comprises a deflecting roller 22 which is arranged so as to deflect and tension the matrix 18. The system 12 is connected to a suitably configured robot arm 23, in order to move the system 12 over the surface 16 of the component 17 and to press the pressing rollers 21 onto the surface 16 and to roll over it (in the direction of the arrows drawn in FIG. 7).

The microstructure can therefore be produced on the surface 16 of the component 17 by way of casting the negative of the matrix 18, by way of the system 12. Herein, the viscous medium 19 is deposited onto the negative of the matrix 18 by way of the module 1 and is subsequently deposited onto the component surface 16 by way of the matrix 18 on account of the rolling movement described above. Herein, a layer 20 of the viscous medium 19 is produced on the component surface 16. The microstructure to be produced is transferred onto the layer 20 by way of casting the negative whilst the layer 20 is located between the component surface 16 and the negative of the matrix 18, by way of the negative of the matrix 18, due to the fact that the matrix with the negative is pressed onto and rolled on the component surface 16. The vicious medium 19 in the layer 20 is moreover cured whilst it is still located between the matrix 18 and the component surface 16, by way of a device 24 for accelerating the curing, which for example can comprise a UV radiation source and a heat source which acts upon the layer 20 through the matrix 18 which is permeable to this radiation. With regard to the viscous medium 19, it can be the case for example of a dual-cure lacquer. Further details concerning this can be deduced from DE 103 46 124 B4 and WO 2005/030472 A1.

With regard to the microstructure, it is the case for example of a riblet structure with rib-like prominences whose heights and distances to one another are between 50 μm to 0.5 μm for example.

Figure 8:
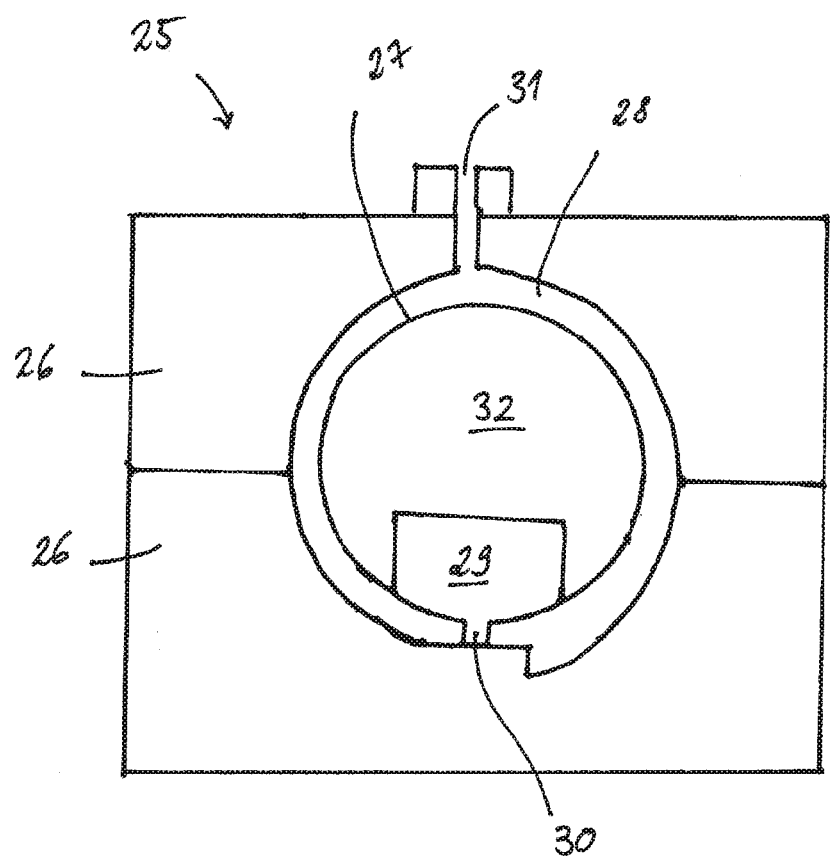

A cross section of a molding tool 25 which is designed to manufacture the module represented in FIG. 1 by way of an injection molding method is shown in FIG. 8. The molding tool 25 is designed as a negative form of the module 1 and comprises a two-part female mold 26 and a two-part core 217. The female mold 26 comprises an interior 28 which is a negative form of the outer surface 4 of the module 1. The core 27 is a negative form of the reservoir 2 of the module 1. A first part 29 of the core 27 comprises a multitude of pins 30 which are negative forms of the nozzle channels 6 of the module 1.

On manufacturing the module 1, a plastic which is suitable for injection molding and is in the flowable condition is fed through an inlet channel 31 of the put-together molding tool 25, into the interior 28 of the female mold 26. A second part 32 of the core 27 can be moved out of the reservoir 2 of the cured module 1, after the curing of the plastic in the molding tool 25. The first part 29 of the core 27 can subsequently also be moved out of the reservoir 2 of the cured module 1, by way of utilizing the free space which has thus arisen

LIST OF REFERENCE NUMERALS 1 module
2 reservoir
3 media connection
4 outer surface
5 outlet region
6 nozzle channel
7 doctor edge
8 end-cap
9 intermediate segment
10 inlet opening
11 outlet opening
12 system
13 delivery device
14 media conduit
15 control unit
16 surface
17 component
18 matrix
19 viscous medium
20 layer
21 pressing roller
22 deflecting roller
23 robot arm
24 device for accelerating the curing of the viscous medium
25 molding tool
26 female mold of the molding tool
27 core of the molding tool
28 interior
29 first part of the core
30 pin
31 inlet channel
32 second part of the core
L longitudinal axis of the module
$d_{min}$ smallest diameter
$d_{max}$ largest diameter
l channel length
$K_1$ inscribed circle
$K_2$ circumscribed circle

The invention claimed is:

1. A module for the depositing of a viscous medium to a surface, including an adhesive or lacquer, wherein the module comprises:
   a reservoir having at least one intermediate segment;
   an outlet region extending along an exterior of the reservoir;
   at least one nozzle channel which fluidically communicates between the outlet region and the reservoir, wherein a smallest diameter ($d_{min}$) of the at least one nozzle channel is smaller than 0.8 mm wherein the module comprises no moving parts for the closure of the at least one nozzle channel; and wherein the at least one intermediate segment is configured for modular interconnection with supplemental intermediate segments each having reservoirs.

2. The module according to claim 1, wherein the at least one nozzle channel includes a plurality of nozzle channels which are arranged in at least one row, wherein the at least one row of nozzle channels runs along a longitudinal extension of the reservoir.

3. The module according to claim 1, wherein the at least one nozzle channel has a channel length (l) which is measured from the reservoir up to the outlet region, wherein the channel length (l) is at least 0.8 mm.

4. The module according to claim 1, wherein a largest diameter ($d_{max}$) of the at least one nozzle channel is smaller than 3 mm.

5. The module according to claim 1, wherein the at least one nozzle channel tapers towards the outlet region.

6. The module according to claim 1, wherein the reservoir is a cavity of the module which is substantially cylindrical.

7. The module according to claim 1, wherein the module is designed to withstand a pressure subjection of the viscous medium in the reservoir of 1.5 bar or more.

8. The module according to claim 1, wherein the module comprises a doctor edge which runs along the outlet region, for distributing the viscous medium on the deposition surface.

9. The module according to claim 8, wherein the doctor edge is arranged on the outer surface of the module.

10. The module according to claim 2, wherein the nozzle channels are arranged in at least two rows, wherein the at least two rows run next to one another along the longitudinal extension of the reservoir.

11. The module according to claim 1, wherein the module is manufactured of plastic.

12. The module according to claim 8, wherein the doctor edge is a part-region of the at least one intermediate segment formed from plastic.

13. The module according to claim 5, wherein the at least one nozzle channel is substantially stepped or conical.

14. The module according to claim 10, wherein the nozzle channels of the at least two rows are arranged offset to one another in the direction of the longitudinal extension of the reservoir.

15. The module according to claim 1, wherein the module comprises two or more media connection elements for feeding the reservoir with the viscous medium.

16. The module according to claim 15, wherein the two or more media connection elements are uniformly distanced to one another.

17. The module according to claim 15, wherein the two or more media connection elements are arranged at opposed ends of the reservoir.

18. The module according to claim 1, wherein the reservoir is comprised of a plurality of intermediate segments.

19. The module according to claim 1, wherein the module includes two end segments laterally terminating the reservoir.

20. The module according to claim 19, wherein the module includes two or more media connection elements for feeding the reservoir with the viscous medium, and each of the two end segments includes one of the two or more media connection elements.

21. The module according to claim 20, wherein the at least one intermediate segment laterally encompasses the reservoir and comprises the at least one nozzle channel.

22. The module according to claim 1, wherein the at least one intermediate segment is comprised of two or more substantially tubular segments.

23. A module for the depositing of a viscous medium to a surface, the module comprising:
one or more intermediate segments, each of the one or more intermediate segments having first and second ends, a component reservoir therebetween, and each of the one or more intermediate segments includes:
an outlet region extending along an exterior of the intermediate segment; and
at least one nozzle channel within the outlet region, the at least one nozzle channel fluidly communicating between the outlet region and the component reservoir, wherein a smallest diameter ($d_{min}$) of the at least one nozzle channel is smaller than 0.8 mm, and wherein the module comprises no moving parts for the closure of the at least one nozzle channel;
at least one end segment having a media connection configured to feed the viscous medium to the component reservoir, wherein the at least one end segment is coupled with one of the first or second ends of the one or more intermediate segments; and
wherein the one or more intermediate segments are configured for modular interconnection with supplemental intermediate segments each having component reservoirs.

24. The module according to claim 23, wherein the at least one nozzle channel includes a plurality of nozzle channels which are arranged in at least one row, wherein the at least one row of nozzle channels runs along a longitudinal extension of the component reservoir.

25. The module according to claim 23, wherein the one or more intermediate segments includes a plurality of intermediate segments each having a component reservoir, and a composite reservoir includes the component reservoirs.

26. The module according to claim 23, wherein the module includes two end segments laterally terminating the reservoir.

27. The module according to claim 26, wherein the module includes two or more media connection elements for feeding the reservoir with the viscous medium, and each of the two end segments includes one of the two or more media connection elements.

* * * * *